(12) United States Patent
Park

(10) Patent No.: US 8,320,695 B2
(45) Date of Patent: Nov. 27, 2012

(54) METHOD, TERMINAL AND COMPUTER-READABLE RECORDING MEDIUM FOR DEBLURRING BARCODE IMAGE

(75) Inventor: Min Je Park, Gyeonggi-do (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/298,414

(22) Filed: Nov. 17, 2011

(65) Prior Publication Data

US 2012/0170862 A1 Jul. 5, 2012

(30) Foreign Application Priority Data

Jan. 4, 2011 (KR) .......................... 10-2011-0000653

(51) Int. Cl.
*G06K 9/40* (2006.01)
*G06K 9/46* (2006.01)
(52) U.S. Cl. .......................... 382/255; 382/250; 382/190
(58) Field of Classification Search .................. None
See application file for complete search history.

(56) References Cited

U.S. PATENT DOCUMENTS 5,307,175 A * 4/1994 Seachman ..................... 358/401
2012/0018518 A1 * 1/2012 Strom et al. ............. 235/462.04

FOREIGN PATENT DOCUMENTS

JP 2008165657 A 7/2008
KR 1020090054301 A 5/2009

OTHER PUBLICATIONS

Esedoglu, "Blind deconvolution of bar code signals", Inverse Problems, vol. 20, 2004, pp. 121-135.*
Kim et al., "Joint nonuniform illumination estimation and deblurring for bar code signals", Optics Express, vol. 15, No. 22, Oct. 29,2007, pp. 14817-14837.*
Saeed Yahyanejad, Removing Motion BLUR From Barcode Images, Master Thesis, KTH University ISAFJORDSGATAN 39, Mar. 2009.*
Press, et al, Numerical Recipes in C++, The Art of Scientific Computing, Second Edition, Cambridge University Press, 2001.

* cited by examiner

*Primary Examiner* — Chan S Park
*Assistant Examiner* — Ha Le
(74) *Attorney, Agent, or Firm* — Husch Blackwell LLP

(57) ABSTRACT

The present invention relates to a method for deblurring a barcode image. The method includes the steps of: acquiring the terminal's n OTFs calculated by varying focal lengths for a subject; if a barcode image is inputted through the mobile terminal, fixing a specific value among NSRs as a value to be applied to an error metric of Wiener filtering, applying n PSFs calculated from the n OTFs to the error metric by a binary search algorithm and determining whether the result of the application to the error metric is not exceeding the pre-set threshold or not; and selecting a PSF value and an NSR value as values of Wiener filtering if the result of the application to the error metric is not exceeding the pre-set threshold and then performing the Wiener filtering to the inputted barcode image by using the selected PSF value and the selected NSR value.

9 Claims, 4 Drawing Sheets

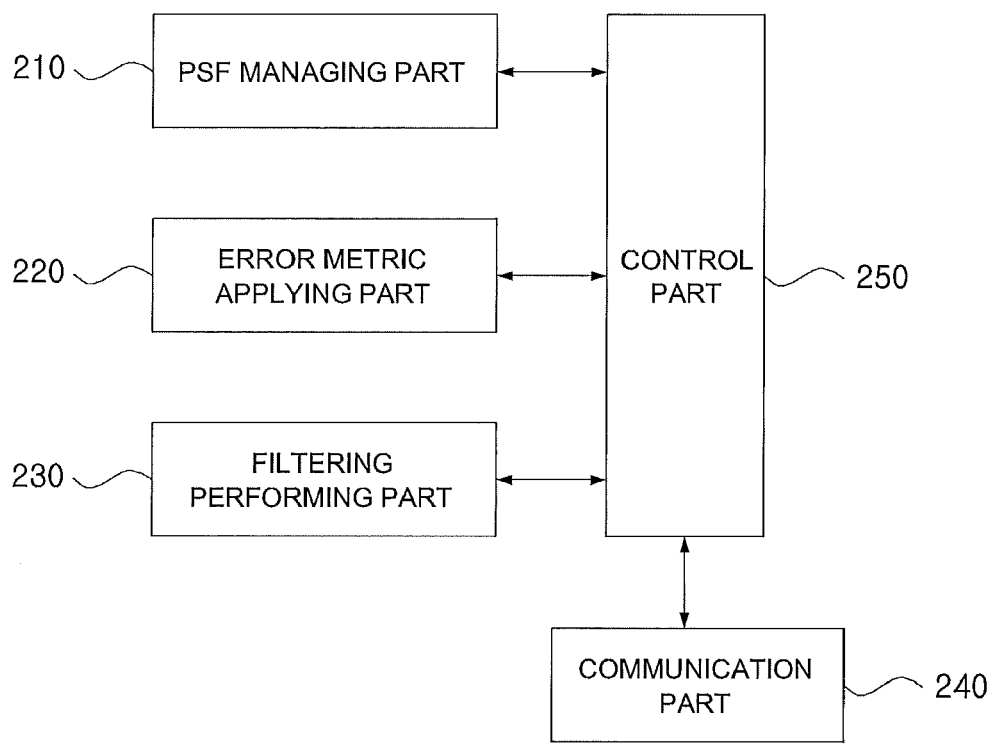

METHOD, TERMINAL AND COMPUTER-READABLE RECORDING MEDIUM FOR DEBLURRING BARCODE IMAGE

TECHNICAL FIELD

The present invention relates to a method, a terminal and a computer-readable recording medium for deblurring an inputted barcode image; and more particularly, to the method, the terminal and the computer-readable recording medium for deblurring the barcode image in a shorter time by (i) calculating point spread functions (PSFs) of a camera module in a mobile terminal while varying focal lengths of the camera module, (ii) extracting an optimal PSF and a noise-to-signal ratio (NSR) by a linear search algorithm or a binary search algorithm, and (iii) applying the Wiener filtering with the extracted PSF and the NSR value to the inputted barcode image.

BACKGROUND OF THE INVENTION

A barcode widely used over the industries was recently designed to increase product management efficiency and has made a great achievement in the sector of the retail market. Based thereon, it is used for a variety of applications even in the fields of other industries. In the past, it was common to use, as devices for reading the barcode, barcode-exclusive recognition devices such as a laser scanner, but thanks to the recent spread of the use of mobile terminals, a method for recognizing the barcode by using cameras equipped on mobile terminals has been introduced.

The cameras on such mobile terminals, however, have generally lower resolution than the laser scanner and they tend to have a serious level of noise. Accordingly, the serious blur of the barcode image taken therefor caused poor barcode reading.

In order to solve the blur problem, several technologies have been presented, among which the representative technology is to estimate the accurate point spread function (PSF) and noise-to-signal ratio of a camera and perform deblurring of a barcode image based on the estimation. However, the technology is not applicable only on the case that the PSF distribution is consistent with a mathematically well-defined Gaussian distribution or a disk distribution but also generally requires a strong level of an image signal sample that may not be adopted on such mobile terminals. For the reason, in reality, it could not be used to improve the blurring of the barcode image taken by camera modules of the general mobile terminals.

Accordingly, the applicant of the present invention came to develop a technology to support deblurring of an inputted barcode image more effectively even in a general mobile terminal environment that has a complicated optical transfer function (OTF) which cannot be approximated to the Gaussian distribution or the disk distribution.

SUMMARY OF THE INVENTION

It is an object of the present invention to solve all the problems mentioned above.

It is another object of the present invention to deblur an inputted barcode image in a real time by shortening the time occupied in the Wiener filtering even in a general mobile terminal environment which has complicated optical transfer functions.

In accordance with one aspect of the present invention, there is provided a method for deblurring a barcode image inputted through a mobile terminal including the steps of: (a) acquiring the mobile terminal's unique n OTFs (optical transfer functions), from 1-st to n-th OTFs, which are calculated by varying focal lengths for a subject; (b) if a barcode image is inputted through the mobile terminal, (i) fixing a specific value among NSRs (noise-to-signal ratios) in an available scope as a value to be applied to an error metric of Wiener filtering, (ii) applying n PSFs (point spread functions) calculated from the n OTFs to the error metric of the Wiener filtering by a binary search algorithm and (iii) determining whether the result of the application to the error metric of the Wiener filtering is not exceeding the pre-set threshold or not; and (c) selecting a PSF value and an NSR value as values of Wiener filtering if the result of the application to the error metric of the Wiener filtering is not exceeding the pre-set threshold and then performing the Wiener filtering to the inputted barcode image by using the selected PSF value and the selected NSR value.

In accordance with another aspect of the present invention, there is provided a method for deblurring a barcode image inputted through a mobile terminal including the steps of: (a) acquiring the mobile terminal's unique n OTFs (optical transfer functions), from 1-st to n-th OTFs, which are calculated by varying focal lengths for a subject; (b) if a barcode image is inputted through the mobile terminal, performing Wiener filtering to the inputted barcode image by linearly applying n PSFs (point spread functions) calculated from the n OTFs and m NSRs, from 1-st to m-th, within an available scope; and (c) selecting a PSF value and an NSR value as values of the Wiener filtering, the selected PSF value and the selected NSR value being determined when the blurring of the barcode image is optimally improved.

In accordance with still another aspect of the present invention, there is provided a terminal for deblurring a barcode image inputted therethrough including: a PSF managing part for calculating n PSFs from n OTFs, i.e., 1-st to n-th OTFs, after the terminal's unique n OTFs which are calculated by varying focal lengths for a subject are acquired; an error metric applying part for, if a barcode image is inputted therefrom, (i) fixing a specific value among NSRs (noise-to-signal ratios) in an available scope as a value to be applied to an error metric of Wiener filtering, (ii) applying n PSFs (point spread functions) calculated from the n OTFs to the error metric of the Wiener filtering by a binary search algorithm and (iii) determining whether the result of the application to the error metric of the Wiener filtering is not exceeding the pre-set threshold or not; and a filtering performing part for selecting a PSF value and an NSR value as values of Wiener filtering if the result of the application to the error metric of the Wiener filtering is not exceeding the pre-set threshold and then performing the Wiener filtering to the inputted barcode image by using the selected PSF value and the selected NSR value.

In accordance with still another aspect of the present invention, there is provided a terminal for deblurring a barcode image inputted therethrough including: a PSF managing part for calculating n PSFs from n OTFs, i.e., 1-st to n-th OTFs, after the terminal's unique n OTFs which are calculated by varying focal lengths for a subject are acquired; and a filtering performing part for linearly applying the n PSFs and m NSRs, i.e., from 1-st to m-th NSRs, within an available scope, if the barcode image is inputted therefrom, to perform Wiener filtering for the inputted barcode image, and then selecting a PSF value and an NSR value as values of the Wiener filtering, the selected PSF value and the selected NSR value being determined when the blurring of the barcode image is optimally improved.

BRIEF DESCRIPTION OF THE DRAWINGS

The above and other objects and features of the present invention will become apparent from the following description of preferred embodiments given in conjunction with the accompanying drawings, in which:

FIG. 2 is a diagram showing the whole configuration of a terminal 200 for deblurring the inputted barcode image in accordance with an example embodiment of the present invention.

DETAILED DESCRIPTION OF THE PREFERRED EMBODIMENTS

Cross-Reference to Related Application

Figure 1A:
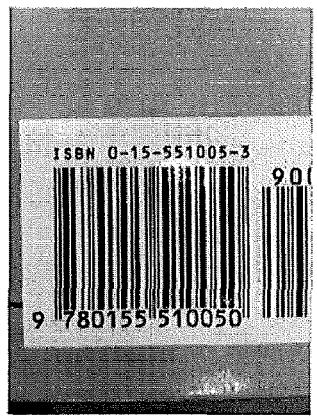
FIG. 1A is a drawing which exemplarily represents an original barcode image.

This application claims priority to and incorporates herein by reference all disclosure in Korean Patent Application No. 10-2011-0000640 filed Jan. 4, 2011.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Wiener Filtering

The present invention relates to a method for deblurring an inputted barcode image effectively by applying a Wiener filtering to the barcode image inputted through a mobile terminal and acquiring optimal PSF (point spread function) and NSR (noise to signal ratio). Below is a general principle of the Wiener filtering.

A Wiener filter is a kind of filter for noise reduction, more specifically, the optimal filter designed as a standard for minimizing the mean square error of the difference between some predicted desired output and the actual filter output in a situation in which signal and noise components are mixed.

As regards a signal process, a signal of the photographed barcode image may be expressed as shown in the following mathematical formula 1:

$$y(t)=h(t)*x(t)+n(t)$$ [Mathematical Formula 1]

where h(t) means a point spread function (PSF); x(t) means a signal of an original barcode image; and n(t) is additional noise arising from a lens, a CCD, etc. of a photographing device. Since the additional noise stops the signal of the original barcode image from being restored simply by applying an inverse function of the PSF, a separate filter g(t) should be applied to an output signal of the photographed barcode image y(t). Therefore, the mathematical relations between g(t) and y(t) may be expressed as seen in the following mathematical formula 2:

$$\hat{x}(t)=g(t)*y(t)$$ [Mathematical Formula 2]

where the Wiener filtering optimally restores the signal of the original barcode image by using a method for least squares. It may be expressed as shown in the mathematical formula 3 below.

$$\mathrm{argmin}_g|\hat{x}(t)-x(t)|^2$$ [Mathematical Formula 3]

If the mathematical formula 3 is transformed into the frequency domain, it may be expressed as shown in the mathematical formula 4 below.

$$\mathrm{argmin}_g|\hat{X}(f)-X(f)|^2$$ [Mathematical Formula 4]

where, if the mathematical formula 4 is differentiated to get G, the following mathematical formula 5 is drawn:

$$G(f) = \frac{H*(f)}{|H(f)|^2 + \left|\frac{N(f)}{Y(f)}\right|^2} = \frac{H*(f)}{|H(f)|^2 + NSR(f)}$$ [Mathematical Formula 5]

In other words, the mathematical formula 5 is a formula for drawing the optimal Wiener filter G(f) and more specifically, it can be found out from the formula 5 that only the information on H(f) and NSR(f) without information on X(f) is used for determining the optimal filter. Therefore, in order to determine the optimal filter, a most appropriate pair of H(f) and NSR(f) should be searched.

Figure 1B:
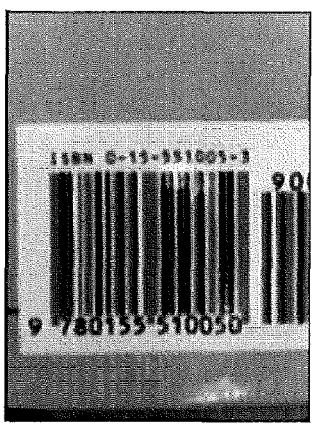
FIG. 1B is a drawing which exemplarily represents a photographed barcode image.

FIG. 1A is a drawing which exemplarily represents an original barcode image. Further, FIG. 1B shows a photographed barcode image and it could be found out that the blur of the photographed barcode image is serious.

Figure 1C:
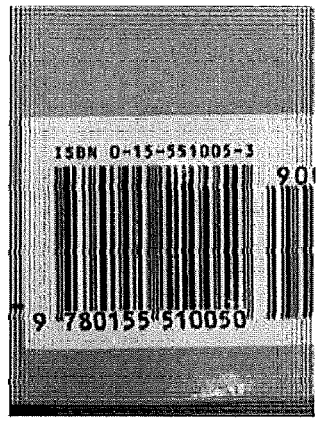
FIG. 1C is a drawing which exemplarily represents a result of deblurring of an inputted barcode image by using the optimal Wiener filtering.

FIG. 1C is a drawing which exemplarily represents a result of deblurring of an inputted barcode image by using the optimal Wiener filtering. As shown in FIG. 1C, if the Wiener filtering is performed by applying the most appropriate of H(f) and NSR(f), the photographed barcode image, therein, might be deblurred almost at the same level as the original barcode image.

Figure 1D:
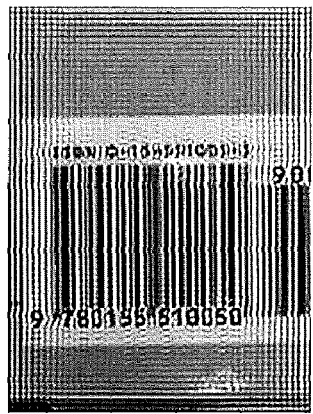
FIG. 1D is a drawing which exemplarily represents a result of deblurring of an inputted barcode image by using Wiener filtering with an inappropriate H(f)
Figure 1E:
FIG. 1E is a drawing which exemplarily represents a result of deblurring of an inputted barcode image by using Wiener filtering with an inappropriate NSR(f).

FIG. 1D is a drawing which exemplarily represents a result of deblurring of an inputted barcode image by using Wiener filtering with an inappropriate H(f), and FIG. 1E is a drawing which exemplarily represents a result of deblurring of an inputted barcode image by using Wiener filtering with an inappropriate NSR(f). If the Wiener filtering is performed by applying an inappropriate H(f) as shown in FIG. 1D and an inappropriate NSR(f) as shown in FIG. 1E, the improvement of blurring is unsatisfactory.

Below is the explanation on how to get the most appropriate H(f) and NSR(f) required to perform the optimal Wiener filtering by using a terminal.

Configuration of the Terminal

FIG. 2 is a diagram showing the whole configuration of a terminal 200 for deblurring the inputted barcode image in accordance with an example embodiment of the present invention.

As illustrated in FIG. 2, the terminal 200 in accordance with an example embodiment of the present invention may include a PSF managing part 210, an error metric applying part 220, a filtering performing part 230, a communication part 240 and a control part 250.

First, if n optical transfer functions (OTFs), i.e., 1-st to n-th OTFs, of a camera module in a mobile terminal are calculated while varying focal lengths of the camera module, the PSF managing part 210 in accordance with an example embodiment of the present invention may perform a function of calculating n point spread functions (PSFs), i.e., from 1-st to n-th PSFs, by applying an inverse function to the calculated OTFs.

According to the conventional technology, since a lens and a CCD of which the mobile terminal, e.g., a photographing device, is composed have their unique OTFs respectively; and the OTF of the whole photographing device can be evaluated not simply by piling up the lens' OTF and the CCD's OTF but only through a sophisticated mathematical analysis, it took a longer time to get the OTF of the photographing device at that time when the barcode was inputted.

The PSF managing part 210 in accordance with an example embodiment of the present invention, hence, may not use a method for checking the OTF of the photographing device through the sophisticated mathematical analysis but may use a method for shortening the time for searching the optimal filter by (i) measuring and recording OTFs when a subject was photographed on n different focal lengths, (ii) getting n PSFs therefrom, and (iii) setting a group of candidates in advance to be applied to H(f) in the mathematical formula 5. By reference, this specification explains the example of fixing a distance from a subject but changing the focal lengths but it is not limited thereto and various examples, e.g., changing a distance from a subject, may be included in the scope of the present invention.

Next, in accordance with an example embodiment of the present invention, if the barcode image is inputted through the mobile terminal, the error metric applying part 220 may fix a specific value among SNR values within an available scope as a value to apply to an error metric of the Wiener filtering, then apply some of n PSFs already calculated by the PSF managing part 210 to the error metric of the Wiener filtering by using a binary search algorithm which has operation counts 2 log (n)+1 to the maximum, and then determine whether the result of these applications is not exceeding the pre-set threshold or not. Herein, the error metric of the Wiener filtering for getting the optimal PSF by the binary search algorithm is as shown in mathematical formula 6 below.

$$\text{error}(H(f)) = |\hat{X}(f) - X(f)|^2 \quad \text{[Mathematical Formula 6]}$$
$$= \left| G(f)Y(f) - \frac{(Y(f) - N(f))}{H(f)} \right|^2$$

(where G(f) is same to that of the mathematical formula 5.)

The error metric of the Wiener filtering is a formula to get a criterion regarding error of the Wiener filtering. For this, a book "Numerical Recipes in C++" co-authored by William H. Press and three others and published in 2001 by "Cambridge University Press" may be referred to (The whole content of the article must be considered to have been combined herein).

Specifically, if the value of N(f) (i.e., NSR(f)) in the mathematical formula 6 is fixed as a specific value among NSRs within the available scope, the error metric of the Wiener filtering may be seen to be increased in proportion to the differences between G(f) and 1/H(f). That is, by reference to the mathematical formulas 5 and 6, it can be found that if a PSF which is more significantly different from the optimal PSF is applied the error value increases. More preferably, the error metric applying part 220 in accordance with an example embodiment of the present invention may extract an NSR of the inputted barcode image immediately and fix the extracted NSR as the value of N(f) to be applied to the error metric of the Wiener filtering.

As shown above, if the error metric of the Wiener filtering increases in proportion to the difference between G(f) and 1/H(f) as the value of the NSR to be applied thereto is fixed, the error metric applying part 220 in accordance with an example embodiment of the present invention may repeatedly go through a process of (i) applying a first PSF corresponding to a point where a distance d is increased from a point of n/2 or a point similar to n/2, a second PSF corresponding to a point where the distance d is decreased from the point of n/2 or a point similar to n/2, and a third PSF of the point corresponding to n/2 to the error metric of the Wiener filtering to thereby get a minimum error value among error values of the above-mentioned three cases in the step (i) (wherein an initial value of d may be set as n/2 or a value similar to it); (ii) if the minimum error value is bigger than the pre-set threshold, after setting d as d/2 or a numerical value similar to d/2, applying a fourth PSF of a point where d (now which is n/4) is increased from a point corresponding to the minimum error value, a fifth PSF of a point where d is decreased from a point corresponding to the minimum error value and a sixth PSF of the point corresponding to the minimum error value to the error metric of the Wiener filtering to thereby get the newly determined minimum error value among error values of the above-mentioned three cases in the step (ii); and (iii) iterating the above-mentioned step (ii) while setting the minimum error value as the newly determined minimum value if the newly determined minimum error value is bigger than the pre-set threshold. That is, the iterating process continues until the result of the application of the error metric produces the newly determined minimum error value not exceeding the pre-set threshold, resulting in the search of the optimal PSF.

Below is a process of the error metric applying part 220 for searching a PSF presented as a pseudo code.

```
m ← n/2;
d ← n/2;
while 1 < d do
    if e_m is not computed yet then
```

-continued

```
|   |   e_m = error(H_m);
|   end
|   e_l ← error(H_{m-d});
|   e_u ← error(H_{m+d});
|   e_min ← min(e_l, e_m, e_u);
|   if e_min < threshold then
|   |   x̂ ← Wiener(y, H_{i_min}, NSR);
|   |   barcode ← decode(x̂);
|   |   if barcode satisfies checksum then
|   |   |   return
|   |   end
|   end
|   d ← d/2;
end
```

With respect to the pseudo code, contrary to the conventional binary search algorithm for sorted data, the method of the error metric applying part 220 for searching the PSF is found to use information on variation of a gradient of the error metric function of the Wiener filtering and information on a point corresponding to a minimum error value in order to find a starting point from which each iteration will be performed. As mentioned above, it is because the error metric of the Wiener filtering increases in proportion to the difference between G(f) and 1/H(f) (a point corresponding to the optimal PSF is an inflection point of the error metric).

In addition, after the error metric applying part 220 finds out the PSF and the NSR which are retrieved at the time when the result of the iteration satisfies the pre-set threshold, the filtering performing part 230 in accordance with an example embodiment of the present invention may perform a function of selecting values of the retrieved PSF and NSR as those of the Wiener filtering and carrying out the Wiener filtering to the inputted barcode image (i.e., applying filter G(f) of the mathematical formula 5) to thereby deblur the barcode image.

In accordance with an example embodiment of the present invention, the communication part 240 may perform a function of allowing the terminal 200 to communicate with an external device.

Furthermore, the control part 250 in accordance with an example embodiment of the present invention may perform a function of controlling the flow of the data among the PSF managing part 210, the error metric applying part 220, the filtering performing part 230 and the communication part 240. In short, the control part 250 in accordance with the present invention may control the PSF managing part 210, the error metric applying part 220, the filtering performing part 230 and the communication part 240 to perform their unique functions by controlling the flow of data from/to outside or the flow of data among the components of the terminal 200.

The above explanation relates to the method for fixing a specific value among NSRs within the available scope as a value to be applied to the error metric and then selecting the optimal PSF and the optimal NSR which are found out at the time when the result of applying n PSFs to the error metric by the binary search algorithm satisfies the pre-set threshold value, but in accordance with an example embodiment of the present invention, it is not limited to this. In accordance with another example embodiment of the present invention, it will be possible to search the optimal Wiener filter by performing the Wiener filtering with n PSFs and m NSRs, i.e., 1-st to m-th NSRs, in an available scope by using linear search algorithm, instead of using the error metric of the Wiener filtering. In particular, another example embodiment of the present invention may be preferable to be applied to either a case that the value of N(f) to be used regularly to the error metric of the Wiener filtering could not be specified because NSR could not be extracted immediately due to weak signal of the inputted barcode image or a case that the number of operation is not expected to be large due to small size of n.

Specifically, the filtering performing part 230 in accordance with another example embodiment of the present invention may perform a function of (i) carrying out the Wiener filtering for the inputted barcode image by linearly applying n PSFs calculated by the PSF managing part 210 and m NSRs, i.e., 1-st to m-st NSRs, within the available scope and (ii) selecting a specific value of PSF and a specific value of NSR which are determined in case the blurring of the barcode image is optimally improved as values of the Wiener filter. This may be expressed as pseudo code as shown below.

```
for i ← 1 to n do
|   for j ← 1 to m do
|   |   x̂ ← Wiener(y, H_i, NSR_j);
|   |   barcode ← decode(x̂);
|   |   if barcode satisfies checksum then
|   |   |   return
|   |   end
|   end
end
```

In other words, on assumption that 30 PSFs are calculated by the PSF managing part 210 and the scope of available NSRs is within 0.0001 to 0.01 and m is 100 by dividing the scope by a unit of 0.0001, the filtering performing part 230 in accordance with another example embodiment of the present invention may extract the optimal PSF and the optimal NSR by determining when the blurring of the barcode image is optimally improved among 3000 (i.e., 30×100) cases of performing the Wiener filtering.

Even in accordance with another example embodiment of the present invention, the PSF managing part 210 may measure and record OTFs when a random subject was photographed on n different focal lengths instead of using a method for acquiring the OTFs of the photographing device through the complicated mathematical analysis and then set up a group of candidates to be applied to H(f) of the mathematical formula 5 in advance by getting n PSFs from the measured OTFs, to thereby shorten the time required for searching the optimal filter.

In accordance with the present invention, it is possible to search the optimal value of Wiener filter within a faster time even in a general mobile terminal environment to thereby deblur the inputted barcode image in real time.

The embodiments of the present invention may be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for deblurring a barcode image inputted through a mobile terminal comprising the steps of:
   (a) acquiring the mobile terminal's unique n OTFs (optical transfer functions), from 1-st to n-th OTFs, which are calculated by varying focal lengths for a subject;
   (b) if a barcode image is inputted through the mobile terminal, (i) fixing a specific value among NSRs (noise-to-signal ratios) in an available scope as a value to be applied to an error metric of Wiener filtering, (ii) applying n PSFs (point spread functions) calculated from the n OTFs to the error metric of the Wiener filtering by a binary search algorithm and (iii) determining whether the result of the application to the error metric of the Wiener filtering is not exceeding the pre-set threshold or not; and
   (c) selecting a PSF value and an NSR value as values of Wiener filtering if the result of the application to the error metric of the Wiener filtering is not exceeding the pre-set threshold and then performing the Wiener filtering to the inputted barcode image by using the selected PSF value and the selected NSR value.

2. The method of claim 1 wherein, at the step of (b), the specific value of NSR is extracted from the inputted barcode image and then the specific value is fixed as the value to be applied to the error metric of the Wiener filtering.

3. The method of claim 2 wherein the step of (b) includes the step of:
   (b1) performing a process of, while the value of the NSR to be applied to the error metric is fixed, applying a first PSF corresponding to a point where a distance d is increased from a point of n/2 (wherein an initial value of d is set as n/2), a second PSF corresponding to a point where the distance d is decreased from the point of n/2, and a third PSF of the point corresponding to n/2 to the error metric of the Wiener filtering to get a minimum error value among error values of the above-mentioned three cases in the step (b1);
   (b2) performing a process of, after setting d as d/2 if the minimum error value is bigger than the pre-set threshold, applying a fourth PSF of a point where d (now which is n/4) is increased from a point corresponding to the minimum error value, a fifth PSF of a point where d is decreased from the point corresponding to the minimum error value, and a sixth PSF of the point corresponding to the minimum error value to the error metric of the Wiener filtering to thereby get a newly determined minimum error value among error values of the above-mentioned three cases in the step (b2); and
   (b3) iterating the step of (b2) while setting the minimum error value as the newly determined minimum value if the newly determined minimum error value is bigger than the pre-set threshold.

4. The method of claim 3 wherein, at the step of (b2), the iteration is performed until the newly determined minimum value becomes the threshold or less.

5. A terminal for deblurring a barcode image inputted therethrough comprising:
   a PSF managing part for calculating n PSFs from n OTFs, i.e., 1-st to n-th OTFs, after the terminal's unique n OTFs which are calculated by varying focal lengths for a subject are acquired;
   an error metric applying part for, if a barcode image is inputted therefrom, (i) fixing a specific value among NSRs (noise-to-signal ratios) in an available scope as a value to be applied to an error metric of Wiener filtering, (ii) applying n PSFs (point spread functions) calculated from the n OTFs to the error metric of the Wiener filtering by a binary search algorithm and (iii) determining whether the result of the application to the error metric of the Wiener filtering is not exceeding the pre-set threshold or not; and
   a filtering performing part for selecting a PSF value and an NSR value as values of Wiener filtering if the result of the application to the error metric of the Wiener filtering is not exceeding the pre-set threshold and then performing the Wiener filtering to the inputted barcode image by using the selected PSF value and the selected NSR value.

6. The terminal of claim 5 wherein the error metric applying part extracts the specific value of NSR from the inputted barcode image and then fixes the specific value as the value to be applied to the error metric of the Wiener filtering.

7. The terminal of claim 6 wherein, while the application value of the NSR is fixed, the error metric applying part (i) performs a function of, while the value of the NSR to be applied to the error metric is fixed, applying a first PSF corresponding to a point where a distance d is increased from a point of n/2 (wherein an initial value of d is set as n/2), a second PSF corresponding to a point where the distance d is decreased from the point of n/2, and a third PSF of the point corresponding to n/2 to the error metric of the Wiener filtering to get a minimum error value among error values of the above-mentioned three cases in the function (i); (ii) performs a function of, after setting d as d/2 if the minimum error value is bigger than the pre-set threshold, applying a fourth PSF of a point where d (now which is n/4) is increased from a point corresponding to the minimum error value, a fifth PSF of a point where d is decreased from the point corresponding to the minimum error value, and a sixth PSF of the point corresponding to the minimum error value to the error metric of the Wiener filtering to thereby get a newly determined minimum error value among error values of the above-mentioned three cases in the function (ii); and (iii) iterates the function of (ii) while setting the minimum error value as the newly determined minimum value if the newly determined minimum error value is bigger than the pre-set threshold.

8. The terminal of claim 7 wherein the error metric applying part performs the iteration until the newly determined minimum value becomes the threshold value or less.

9. One or more non-transitory computer-readable recording media having stored thereon a computer program that, when executed by one or more processors, causes the one or more processors to perform acts including:
   acquiring the mobile terminal's unique n OTFs (optical transfer functions), from 1-st to n-th OTFs, which are calculated by varying focal lengths for a subject;
   if a barcode image is inputted through the mobile terminal, (i) fixing a specific value among NSRs (noise-to-signal ratios) in an available scope as a value to be applied to an error metric of Wiener filtering, (ii) applying n PSFs (point spread functions) calculated from the n OTFs to the error metric of the Wiener filtering by a binary search algorithm and (iii) determining whether the result of the application to the error metric of the Wiener filtering is not exceeding the pre-set threshold or not; and selecting a PSF value and an NSR value as values of Wiener filtering if the result of the application to the error metric of the Wiener filtering is not exceeding the pre-set threshold and then performing the Wiener filtering to the inputted barcode image by using the selected PSF value and the selected NSR value.

* * * * *